United States Patent
Zhu et al.

(10) Patent No.: US 12,408,246 B2
(45) Date of Patent: Sep. 2, 2025

(54) LED LIGHTING CIRCUIT, TEMPORAL DIMMER CIRCUIT AND CONTROL METHOD BASED ON PWM

(71) Applicant: SWIT ELECTRONICS CO., LTD., Nanjing (CN)

(72) Inventors: Xiaohui Zhu, Nanjing (CN); Xunran Ji, Nanjing (CN)

(73) Assignee: SWIT ELECTRONICS CO., LTD., Nanjing (CN)

(*) Notice: Subject to any disclaimer, the term of this patent is extended or adjusted under 35 U.S.C. 154(b) by 225 days.

(21) Appl. No.: 18/255,534

(22) PCT Filed: Dec. 10, 2020

(86) PCT No.: PCT/CN2020/135124
§ 371 (c)(1),
(2) Date: Jun. 1, 2023

(87) PCT Pub. No.: WO2022/120677
PCT Pub. Date: Jun. 16, 2022

(65) Prior Publication Data
US 2024/0023216 A1    Jan. 18, 2024

(30) Foreign Application Priority Data
Dec. 7, 2020 (CN) .......................... 202011430044.X

(51) Int. Cl.
*H05B 45/30* (2020.01)
*H05B 45/10* (2020.01)
(Continued)

(52) U.S. Cl.
CPC .......... *H05B 45/325* (2020.01); *H05B 45/10* (2020.01); *H05B 45/345* (2020.01)

(58) Field of Classification Search
CPC .... H05B 45/10; H05B 45/30; H05B 445/325; H05B 45/345; H05B 47/10
See application file for complete search history.

(56) References Cited

U.S. PATENT DOCUMENTS

2013/0026931 A1*  1/2013  Jong ...................... H05B 45/14
                                                         315/201
2014/0232270 A1   8/2014  Kimura
2019/0373691 A1* 12/2019  Zheng ................... H05B 45/50

FOREIGN PATENT DOCUMENTS

CN    100446724 C  * 12/2008
CN    201623897 U    11/2010
(Continued)

OTHER PUBLICATIONS

International Search Report dated Aug. 26, 2021 for International Application No. PCT/CN2020/135124.

*Primary Examiner* — Jimmy T Vu

(57) ABSTRACT

Disclosed is an LED lighting circuit based on PWM, including a power source, a control circuit and an LED light-emitting element, and further including a non-light-emitting load element. The non-light-emitting load element is connected in parallel to the LED light-emitting element, the power source is connected to a constant-current source, the constant-current source supplies power to the LED light-emitting element and the non-light-emitting load element, and when the constant-current source is in a current rising or falling phase, the control circuit controls an LED light-emitting element loop to be disconnected, and controls a non-light-emitting load element loop to be connected; and when the current of the constant-current source is in a steady state, the control circuit controls the non-light-emitting load element loop to be disconnected, and controls the LED light-emitting element loop to be connected.

15 Claims, 15 Drawing Sheets

(51) Int. Cl.
     *H05B 45/325*      (2020.01)
     *H05B 45/345*      (2020.01)

(56) References Cited

FOREIGN PATENT DOCUMENTS

| | | | |
|---|---|---|---|
| CN | 102421230 A | | 4/2012 |
| CN | 102458004 A | * | 5/2012 |
| CN | 104812146 A | | 7/2015 |
| CN | 107770893 A | | 3/2018 |
| CN | 110381628 A | | 10/2019 |

* cited by examiner

LED LIGHTING CIRCUIT, TEMPORAL DIMMER CIRCUIT AND CONTROL METHOD BASED ON PWM

TECHNICAL FIELD

The present disclosure belongs to the field of lighting in the film-television industry, and in particular relates to an LED lighting circuit, a temporal dimmer circuit and a control method based on PWM.

BACKGROUND

At present, colored lighting equipment outputs different colors by mixing light of three primary colors of red, green, and blue (RGB) according to different proportions. To solve the problems of obvious color cast of white light caused by the mixing of lamp beads in three colors (RGB), low color rendering index, color temperature adjusting range and accuracy, one path of white light W or two paths of white light W with high and low color temperatures are added on the basis of three colors (RGB) to form RGBW and RGBWW modes, or amber A is added to form an RGBA mode. However, white-light lighting equipment realizes color temperature adjustment by means of light mixing of two paths of white light W with high and low color temperatures, that is, a WW mode. It is necessary to solve the problem about the driving of lamp beads regardless of the mode used. Currently, the most commonly used driving method in the lighting equipment of the film-television industry includes the steps of driving and controlling lamp beads of different colors, respectively by employing a plurality of constant-current sources after a main power source is inputted, and controlling the on/off of a lamp bead string by utilizing PWM signals with different duty cycles, so as to complete light mixing of the lamp beads and realize color adjustment. This method is easy to realize. However, in order to avoid power overload of a power source during simultaneous working of a plurality of lamp bead strings, with respect to designing, it is commonly required to take the sum of maximum power of the plurality of lamp bead strings which work alone as total power of the power source, which will lead to actual power at which the lighting equipment works not reaching the nominal power. For example, in an RGB mode, the actual power is only one third of the nominal power when the lighting equipment works.

To solve the above problems, the invention patent application with the application number of 201110272764.2 discloses a color adjustment driver for an LED lamp, which divides light source module control signals corresponding to three colors by time through a time division multiplexing control module, making at most one of them be at a high level at any moment. At most one of power output modules outputs driving voltage or current to drive a corresponding light source module to emit light. In this way, electric energy provided by a power converter is distributed to different branch circuits in different time periods in turn for use. An embodiment provides a solution for controlling the on/off of light source modules by utilizing one constant-current driver and three switches, which illustrates that colors can be mixed by adjusting the time of high levels of the light source module control signals to form different colors and brightness states, and also illustrates that the high levels of all the light source module control signals are evenly spaced within control time T. This can further keep the stability of output power of the power converter.

However, in practical application of this solution, since there is response time in a switching tube, that is, there is a time delay between one lamp bead string being turned off and another lamp bead string being turned on in an actual high-brightness state. In this period of delay time, the load of the constant-current driver is discontinuous. In a half-brightness state, in order to keep the stability of the output power of the power converter, the high levels of all the control signals are evenly spaced and the load of the constant-current driver is also discontinuous. The discontinuous load will lead to abnormal discharge of inductance energy in a circuit of the constant-current driver, thereby resulting in abnormal circuit operation, such as flicker or abnormal brightness of the light source modules, and even damages to circuit devices. In addition, since a single constant-current source driver outputs constant current all the time, the interval among the high levels of all the control signals cannot be adjusted freely with respect to keeping the stability of the output power of the power converter, resulting in a limited range of brightness adjustment of this solution.

Because of the discontinuous load, when the cycle of multi-PWM temporal dimming is at a millisecond level, the above factor can be ignored. But in the film-television industry, it is required to make photographic effects of professional cameras have no picture flicker, which needs a PWM cycle at a level of dozens of microseconds or less, and therefore, the problem of the discontinuous load cannot be ignored. In addition, it is required in the film-television industry that the brightness of the lighting equipment can be smoothly adjusted in a wide range. Despite of this, the range of brightness adjustment of this technical solution in the prior art is limited and cannot meet the requirements of adjusting light brightness in the film-television industry.

SUMMARY

1. Problem to be Solved

In view of the problems in the field of film-television lighting in the prior art that the light brightness and color cannot meet user requirements due to discontinuous load, the present disclosure provides an LED lighting circuit, a temporal dimmer method and system based on PWM. Further, the present disclosure also can solve the problem that the brightness of a film-television lighting system cannot be adjusted stably in a wide range.

2. Technical Solution

To solve the above problems, the present disclosure adopts the following technical solution: an LED lighting circuit based on PWM, including a power source, a control circuit and an LED light-emitting element, and further including a non-light-emitting load element. The non-light-emitting load element is connected in parallel to the LED light-emitting element, the power source is connected to a constant-current source, the constant-current source supplies power to the LED light-emitting element and the non-light-emitting load element, and when the constant-current source is in a current rising or falling phase, the control circuit controls an LED light-emitting element loop to be disconnected, and controls a non-light-emitting load element loop to be connected; and when the current of the constant-current source is in a steady state, the control circuit controls the non-light-emitting load element loop to be disconnected, and controls the LED light-emitting element loop to be connected. According to this technical solution, the non-light-emitting load element is controlled to be connected in the current rising or falling phase of the constant-current source to consume circuit energy in a non-constant-current phase, to avoid a condition that the display and adjustment for the brightness and color of the lighting equipment will be unbounded to PWM signals when the current of this phase acts on a light-emitting element and further affect the adjustment for the brightness and color of the lighting equipment. In a current stabilization phase, the light-emitting element is controlled to be connected, thereby enabling users to adjust the brightness and color of light more accurately.

Further, the non-light-emitting load element is a resistor.

Further, 2 non-light-emitting load elements are provided, one is turned on in the current rising phase of the constant-current source and the other is turned on in the current falling phase of the constant-current source. By adopting this technical solution, current rising time and current falling time may be controllable, respectively, and the freedom of design is higher; and meanwhile, the current rising time and the current falling time are shorter and the heat loss is lower.

The present disclosure further provides a temporal dimmer control circuit based on PWM, including a main power source used for supplying power to the whole circuit, and further including: at least two LED light-emitting elements, a constant-current source, used for providing a drive current to the LED light-emitting elements; a control module, used for controlling the on/off of a switching circuit; a switching circuit, used for controlling the on/off of a connection between the constant-current source and the LED light-emitting elements; the constant-current source, the switching circuit, and the LED light-emitting elements being connected in series; the switching circuit including at least two switches, each switch being connected to one LED light-emitting element, and the control module outputting a PWM control signal to control the on/off of the switching circuit; and when the LED light-emitting elements are switched, the control module controlling PWM waveforms corresponding to the two LED light-emitting elements to be partially overlapped. In this technical solution, the PWM waveforms corresponding to the two LED light-emitting elements are partially overlapped under the control of the control module, so as to realize continuous load of the circuit at the moment of switching the two LED light-emitting elements, solving the problem in the prior art that the stability of the brightness and color of light sources cannot meet user requirements when the users adjust the brightness and color of light.

Further, the control module controls a PWM signal corresponding to the latter LED light-emitting element to output a high level, and then controls a PWM signal corresponding to the former LED light-emitting element to output a low level, so that the PWM waveforms corresponding to the two LED light-emitting elements are partially overlapped. At the moment of switching the two LED light-emitting elements, it is always to control a PWM signal corresponding to the latter LED light-emitting element to output the high level, and then control a PWM signal corresponding to the former LED light-emitting element to output the low level, so as to realize the continuous load of the circuit at the moment of switching the two LED light-emitting elements, solving the problem in the prior art that the stability of the brightness and color of light sources cannot meet user requirements when the users adjust the brightness and color of light. Further, a plurality of the constant-current sources are provided. In this technical solution, a plurality of levels of constant-current sources are disposed. In general, the one having the maximum current is an ampere-level constant-current source; the ampere-level constant-current source is disposed to meet the requirements of high brightness of a lighting system, and constant-current sources in lower and more levels are disposed to meet the requirements of smooth transition of the lighting system, so that the present disclosure not only can meet user requirements on high brightness of light, but also can adjust the brightness and color very smoothly when the users adjust the brightness and color.

Further, the control module controls the on/off of a plurality of switching circuits, and performs temporal calling on a plurality of constant-current sources within a single cycle to adjust the drive current of the LED light-emitting elements;

alternatively, the control module controls the on/off of the plurality of switching circuits to select the constant-current sources with different current to drive the LED light-emitting elements.

In the above two technical solutions, in order to realize smooth adjustment of the brightness, the control module not only can control to realize the temporal calling on the plurality of constant-current sources within a single cycle, but also can select different constant-current sources to drive the LED light-emitting elements when different brightnesses need to be outputted.

Further, two constant-current sources are provided, one is an ampere-level constant-current source, and the other is a milliampere-level constant-current source. In this technical solution, only two constant-current sources may be adopted. When the light is in a low-brightness phase, only the milliampere-level constant-current source works; when the light is in a high-brightness or normal-brightness phase, the ampere-level constant-current source and the milliampere-level constant-current source work at the same time; and using the two constant-current sources may provide a simpler control circuit and a lower cost while user requirements on high brightness and smooth adjustment of brightness are met.

Further, the control module includes a user control module and a driving module; the user control module is used for receiving user's instructions, converting same into time points at which high and low levels of PWM signals are converted, and sending to the driving module; the driving module includes a register and a PWM generator; the register is connected to the PWM generator; the register receives and saves the time points at which the high and low levels of the PWM signals are converted, which are sent by the control module, and then transmits same to the PWM generator; and the PWM generator generates and outputs PWM signals for controlling the constant-current sources and the switching circuits, respectively.

Further, a non-light-emitting load element is further included; the non-light-emitting load element is connected in parallel to the LED light-emitting element; in a current rising or falling phase of the constant-current source, the control module controls an LED light-emitting element loop to be disconnected, and controls a non-light-emitting load element loop to be connected; and when the current of the constant-current source is steady, the control module controls the non-light-emitting load element loop to be disconnected, and controls the LED light-emitting element loop to be connected. An objective of disposing the non-light-emitting load element is to solve the problems that when the constant-current source is on, off, or switched, there is a current rising or falling phase, current is changing in both two phases, and users cannot adjust the brightness accurately in a case that the LED light-emitting element is connected in a current changing phase so that the accuracy of color is also low. The non-light-emitting load element in this technical solution works in the current rising or falling phase, that is, only the non-light-emitting load element is turned on but the LED light-emitting element is not turned on in an unsteady current state; and when the circuit is steady, the control module outputs PWM signals again to control on/off switching of all the LED light-emitting elements, thereby solving the problem of inaccurate brightness and color adjustment caused by current changes.

The present disclosure further provides a temporal dimmer control method based on PWM, which is used for the above temporal dimmer control circuit based on PWM, the method including: when LED light-emitting elements are switched and when the two LED light-emitting elements are switched, controlling PWM waveforms corresponding to the two LED light-emitting elements by a control module to be partially overlapped. Partial overlapping of the PWM waveforms corresponding to the two LED light-emitting elements enables a circuit load to keep steady all the time, thereby solving the problem in the prior art that the stability of the brightness and color of light sources cannot meet user requirements in the prior art due to discontinuous circuit load.

Further, the control module controls a PWM signal corresponding to the latter LED light-emitting element to output a high level, and then controls a PWM signal corresponding to the former LED light-emitting element to output a low level. In this technical solution, when the two LED light-emitting elements are switched, it is always to turn on the latter LED light-emitting element and then turn off the former LED light-emitting element, thereby solving the problem in the prior art that the stability of the brightness and color of light sources cannot meet user requirements in the prior art due to discontinuous circuit load.

Further, the control method further includes:
S1: receiving and converting a user input instruction by the control module into a PWM duty cycle;
S2: sending the PWM duty cycle signal to a register in the control module, and sending a received PWM duty cycle signal by the register to a PWM generator to generate a PWM signal; and
S3: outputting the PWM signal by the control module to control the switching of the LED light-emitting elements and a constant-current source, respectively;
alternatively,
S1': receiving and converting a user input instruction by the control module into a PWM duty cycle;
S2': converting the PWM duty cycle of the corresponding LED light-emitting element in step S1' into a time point at which high and low levels of a PWM signal are converted;
S3': sending the time point corresponding to each LED light-emitting element in step S2' into a register in the control module, and sending the stored time point by the register to a PWM generator to generate a PWM signal; and
S4': outputting the PWM signal by the control module to control the switching of the LED light-emitting elements and a constant-current source, respectively.

There are two solutions for converting the user input instruction into the PWM duty cycle to obtain the PWM signal after being received by the control module. One solution is to directly generate the PWM signal by utilizing the PWM generator, and the other solution is to convert the PWM duty cycle into the time points at which high and low levels of the PWM signal are converted, store all the time points, then send same to the PWM generator, and generate the PWM signal by the PWM generator according to the time points at which high and low levels are converted.

Compared with the former technical solution, the latter technical solution occupies fewer chip logical resources and has higher portability, and can correspondingly change the PWM signal according to changes of the constant-current source and the switching circuit and is more flexible.

Further, in current rising and falling phases of the constant-current source, the control module controls the LED light-emitting element loop to be disconnected, and controls the non-light-emitting load element loop to be connected; and when the current is steady, the control module controls the non-light-emitting load element loop to be disconnected, and controls the LED light-emitting element loop to be closed.

3. Beneficial Effects

Compared with the prior art, the present disclosure has the following beneficial effects:
(1) The present disclosure can solve the problem that the brightness and color of light cannot meet user requirements due to discontinuous load in the multi-PWM temporal dimmer circuit, and lighting equipment employing the present disclosure has higher color stability and accuracy and can realize more abundant and accurate colors.
(2) The present disclosure can solve the problem that a brightness adjustment range is limited in the PWM temporal dimmer circuit, which is driven by a single constant-current source, and adjust the brightness smoothly in a wide range, without sudden changes.

Figure 1:
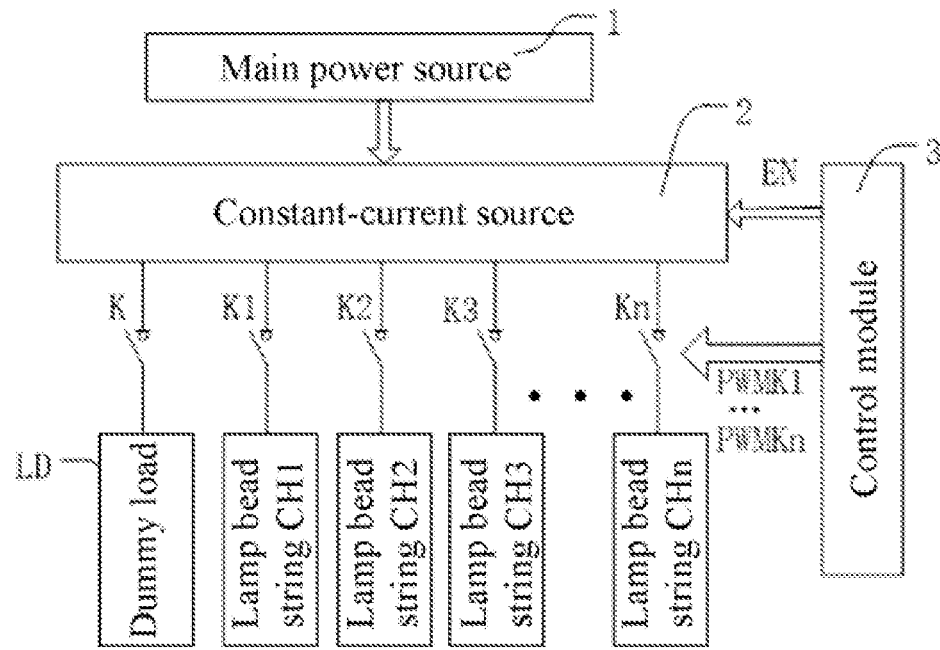
FIG. 1 is a systematic principle block diagram of the present disclosure.

Reference numerals in the figures: 1: main power source; 2: first constant-current source; 3: control module; 4: second constant-current source; 5: multi-level adjustment circuit; 6: user control module; 7: driving module; 8: register; 9: synchronizer; 10: PWM generator; 11: power conversion module.

DETAILED DESCRIPTION

The present disclosure is further described below with reference to specific embodiments. In the following embodiments, LED light-emitting elements are lamp bead strings.

Embodiment 1

A multi-PWM temporal dimmer system, as shown in FIG. 1, includes a main power source 1, a first constant-current source 2, a control module 3, switching circuits K, K1, K2, K3 . . . Kn, a non-light-emitting load element LD (also referred to as a dummy load LD and represented as the dummy load LD in the accompanying drawings of the specification), and lamp bead strings CH1, CH2, CH3 . . . CHn. The main power source 1 may be an AC or DC external power source input. It should be noted that, since LED lamp beads are non-linear elements, current will increase obviously when voltage increases slightly in a turn-on state and overcurrent is easy to cause. Therefore, there is a need of the first constant-current source 2; and after being inputted, the main power source 1 passes through the first constant-current source 2 and is subjected to AC-DC or DC-DC conversion to form a constant-current output for driving the plurality of lamp bead strings to emit light. The number of the lamp bead strings CH1, CH2, CH3 . . . CHn is determined by a dimming mode selected by the system, which may be RGB, RGBW, RGBWW, RGBA and WW modes, etc. For example, if the RGBW mode is selected, the number of the lamp bead strings is 4.

In this embodiment, CH1 represents a red-light lamp bead string, CH2 represents a green-light lamp bead string, CH3 represents a blue-light lamp bead string, and CH4 represents a white-light lamp bead string. Generally, a non-light-emitting energy-consumption device, such as a resistor, is selected as the non-light-emitting load element LD; and the non-light-emitting load element LD is turned on in current rising and falling phases of the constant-current source and is used for consuming circuit energy in a non-constant-current phase, preventing these two phases from acting on the lamp bead strings and affecting the brightness and color of lighting equipment. Since the current in the rising and falling phases of the constant-current source is in a changing state, the display and adjustment of the brightness and color of the lighting equipment will be unbounded to PWM signals when the lamp bead strings in these two phases are turned on. With regard to the field of film-television lighting, the brightness and color are not accurate enough, so it is necessary to prevent the lamp bead strings from being turned on in these two phases as much as possible.

The number of the switching circuits K1, K2, K3 . . . Kn corresponds to the number of the lamp bead strings, that is, one switching circuit controls one lamp bead string, so as to realize temporal control of the lamp bead strings. Another switching circuit K is used for controlling the on/off of the non-light-emitting load element LD. In specific implementation, the switching circuits K, K1, K2, K3 . . . Kn may be realized by an MOSFET, an IGBT, a triode, a GaN field-effect transistor or a high-speed relay, etc., and the control module 3 is used for outputting an enabling signal EN and PWMK, PWMK1 . . . PWMKn signals; the enabling signal EN is an enabling signal of the first constant-current source 2; the PWMK, PWMK1 . . . PWMKn signals are used for controlling the on/off of the switching circuits K, K1, K2, K3 . . . Kn; and the power supply for the control module 3 is realized by the main power source through AC-DC or DC-DC (not shown in the figure). The control module 3 may be realized by logic control chips such as an MCU, a CPLD, an FPGA or a DSP.

For convenience of description of the function of the non-light-emitting load element LD, the lamp bead strings CH1, CH2, CH3 . . . CHn in FIG. 1 are simplified as a lamp bead string CH in FIG. 2 in the description. The shutter speed of a video camera in the film-television industry is generally at the microsecond level, and different frame rates may be selected for shooting. For the situation of higher frame rate or more extreme shutter speed, in order to satisfy the requirements of no flickering lights during shooting in the film-television industry, cycle time T should be set to meet the requirements; and the cycle time T refers to the sum of the total time in which all the lamp bead strings CH1, CH2, CH3 . . . CHn are turned on and off once, the on-time of the non-light-emitting load element LD, and the off-time of the constant-current source. In this embodiment, the cycle time T may be selected as 50 us. In specific implementation, the length of the cycle time T may be determined according to the specific shutter speed and frame rate for shooting of the video camera.

Figure 2:
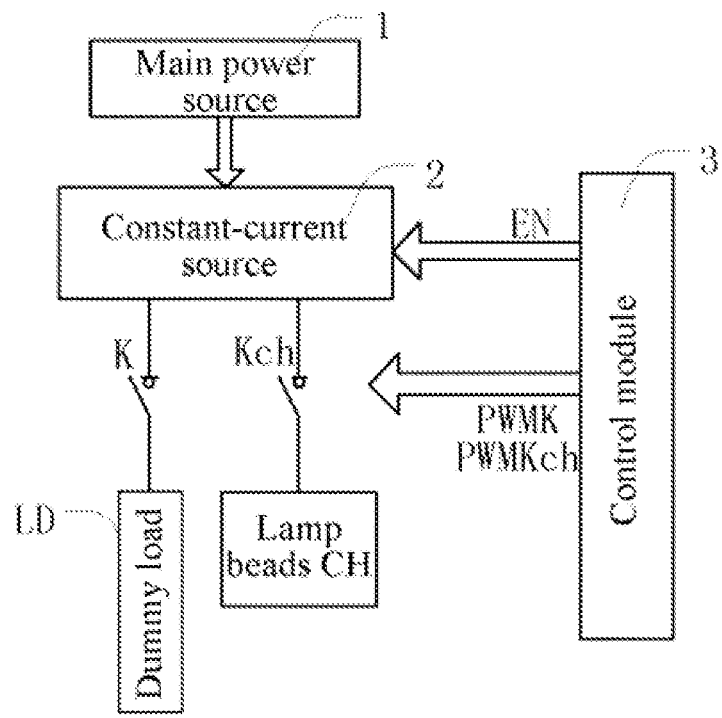
FIG. 2 is a simplified principle block diagram of FIG. 1 (a plurality of strings of lamp beads are simplified into one string).
Figure 3:
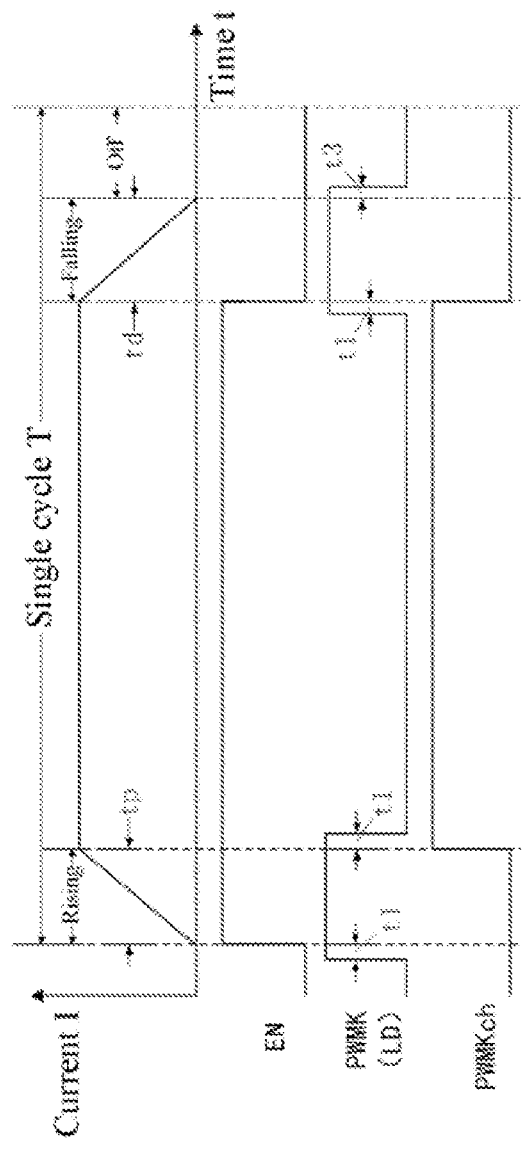
FIG. 3 is a timing diagram of FIG. 2.

However, the adjustment of light can meet high requirements in the film-television industry only if the cycle time T is less than the shutter speed. To ensure that the load of the first constant-current source 2 is continuous under the condition that the lighting equipment is not under the maximum brightness, the first constant-current source 2 needs to be disconnected after all the lamp bead strings CH1, CH2, CH3 . . . CHn are turned on in sequence. As shown in FIG. 2 and FIG. 3, within the cycle time T (also can be referred to as cycle T), the control module 3 outputs the enabling signal EN to control the first constant-current source 2 to output current I. Since there is an inductance in a circuit of the first constant-current source 2, the current outputted thereby cannot change abruptly, that is, the current cannot change from 0 to 1 or from 1 to 0 instantly and has rising and falling phases. In the two phases, output current of the first constant-current source 2 is changing constantly, and changes of the output current will lead to inaccurate brightness adjustment performed by users, which will also lead to inaccurate color display. Therefore, the lamp bead string CH can only be turned on or off within phases excluding these two phases. To enable inductance energy of the first constant-current source 2 in these two phases to be normally released, there is a need of an additional non-light-emitting energy-consumption device serving as a temporary load, that is, the non-light-emitting load element LD described in the present disclosure. Generally, a non-light-emitting energy-consumption device, commonly such as a resistor, is selected as the non-light-emitting load element. In both current rising and falling phases of the constant-current source, the control module 3 outputs the PWMK signal to control the switching circuit K to be connected and the non-light-emitting load element LD to be turned on. At this time, only the non-light-emitting load element LD in the circuit works. After the current is outputted stably and constantly, the PWMK signal controls the switching circuit K to be disconnected and the non-light-emitting load element LD to be turned off, and a PWMKch signal is outputted to control a switching circuit Kch to be connected and the lamp bead string CH to be turned on; and during the adjustment of the lamp bead string CH, the first constant-current source 2 keeps outputting current continuously and constantly.

The non-light-emitting load element LD and the lamp bead string CH are turned on or off by means of the switching circuits K and Kch, but the switching circuits have a problem about a switching speed. In order to avoid affecting the lighting equipment by the switching speed of the switching circuits, the control module 3 is adopted in the present disclosure to output a high level of the PWMK signal a duration t1 in advance to control the switching circuit K to be connected, and output a low level of the PWMK signal by delaying for the duration t1 to control the switching circuit K to be disconnected, as shown in FIG. 3. In the turn-off phase of the first constant-current source 2 within the single cycle time T, since the first constant-current source 2 has been turned off by the enabling signal EN outputted by the control module 3, a duration t3 is not necessary.

The durations t1 and t3 are generally determined according to the properties of the switching circuits K and Kch. For example, the switching circuits K and Kch are realized by MOSFET AON7534, and their theoretical on-time is 8.8 ns and theoretical off-time is 22.3 ns. In this case, the durations t1 and t3 may be set as 30 ns. The above method adopted by the present disclosure can solve the problem that the brightness and color of light are not stable and cannot meet user requirements due to the discontinuous load of the circuit, caused by the response time of switches and periodic rising and falling problems of the constant-current source.

Figure 4:
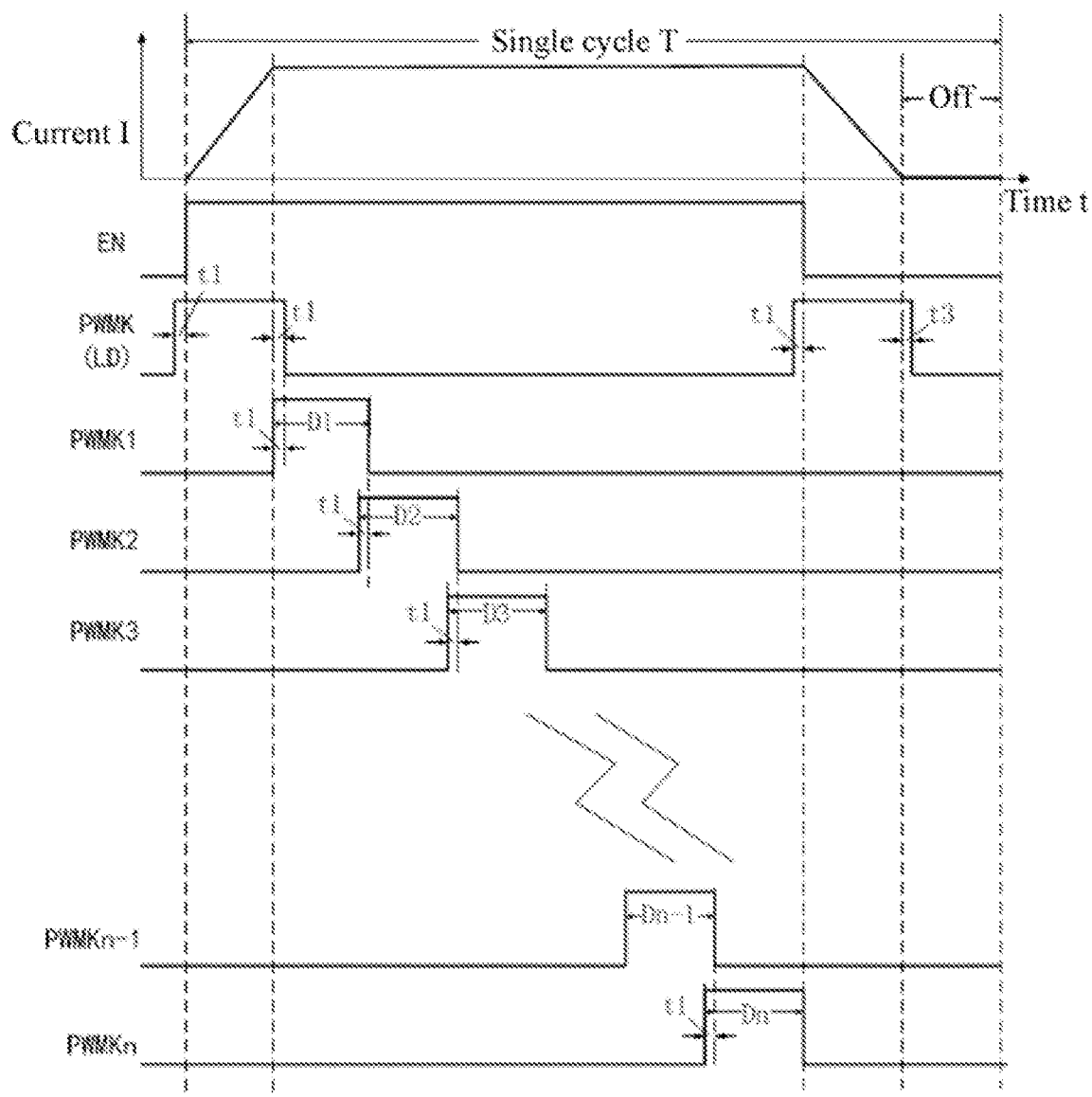
FIG. 4 is a timing diagram of FIG. 1.

With respect to the dimmer system as shown in FIG. 1, assuming that required light colors can be obtained by turning on the lamp bead strings CH1, CH2, CH3 . . . CHn within the cycle time T for durations D1, D2, D3 . . . Dn, respectively, the timing diagram of the whole system is as shown in FIG. 4. At the moment of switching the non-light-emitting load element LD and the lamp bead string CH1, the control module 3 controls PWM waveforms corresponding to the two LED light-emitting elements to be partially overlapped, thereby realizing the continuous load of the circuit at the moment of switching the two LED light-emitting elements. In this embodiment, the adopted manner is that the control module 3 outputs a high level of the PWMK1 signal the duration t1 in advance before a low level of the PWMK signal is outputted to control the switching circuit K1 to be connected and the lamp bead string CH1 to be turned on, and output a low level of the PWMK signal after the duration t1 to control the switching circuit K to be disconnected. At the moment of switching the lamp bead string CH1 and the lamp bead string CH2, the control module 3 outputs a high level of the PWMK2 signal the duration t1 in advance before a low level of the PWMK1 signal is outputted to control the switching circuit K2 to be connected and the lamp bead string CH2 to be turned on, and output a low level of the PWMK1 signal after the duration t1 to control the switching circuit K1 to be disconnected and the lamp bead string CH1 to be turned off. By analogy, at the moment of switching the two lamp bead strings, the control module 3 always controls the PWM signal corresponding to the latter lamp bead string to output a high level and then controls the PWM signal corresponding to the former lamp bead string to output a low level (in the description of the present disclosure, the former one refers to the lamp bead string turned on before the switching of the two lamp bead strings and the latter one refers to the lamp bead string turned on after the switching of the two lamp bead strings). The purpose of doing this is to make the circuit load continuous at the moment of switching the two lamp bead strings and the constant-current source can output current I continuously to stabilize the brightness and color of the lamp bead strings. Therefore, the brightness is adjusted through the sum of the duty cycles of the lamp bead strings and the color is adjusted through the proportion of the duty cycles of all the lamp bead strings, that is, the adjustment of the brightness and color can be realized by changing the durations of D1, D2, D3 . . . Dn.

The control module 3 described in the present disclosure controls the PWM signal to adopt a positive logic and take a high level as an effective level, and controls the constant-current source 2 to drive the lamp bead string CH to emit light. In specific implementation, a negative logic may also be adopted and a low level is taken as an effective level, or a manner with mixed positive and negative logics is adopted.

Figure 5:
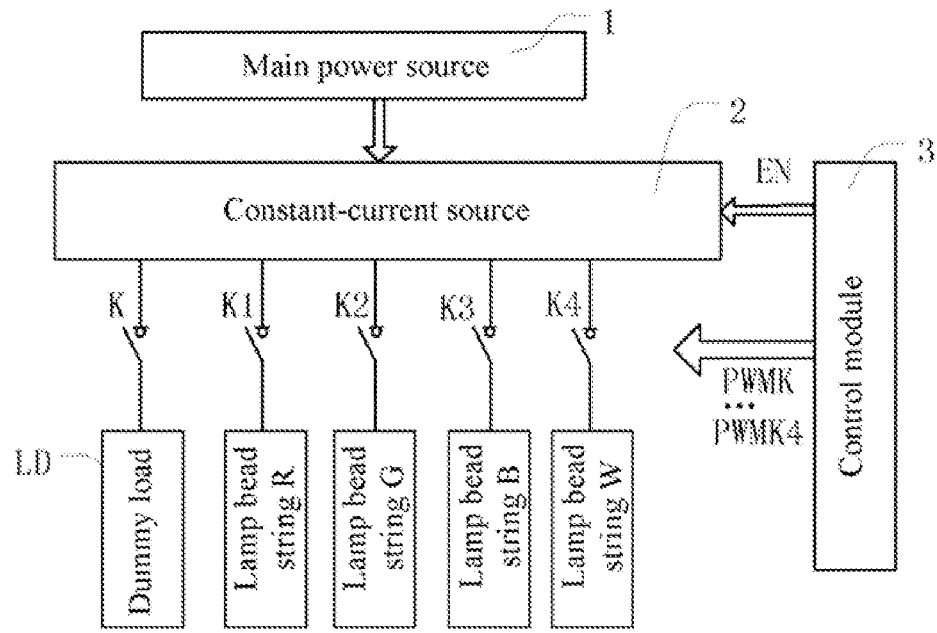
FIG. 5 is a systematic principle block diagram in an RGBW mode of the present disclosure.
Figure 6:
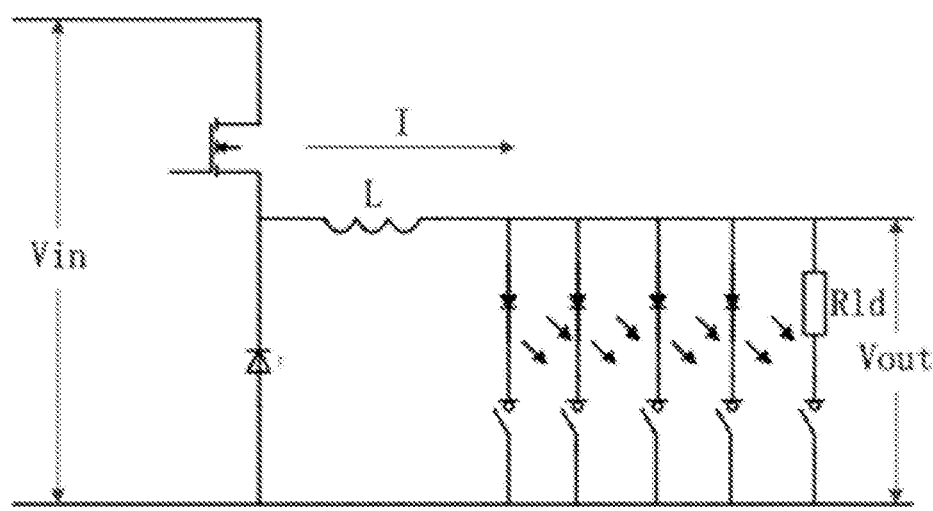
FIG. 6 is an equivalent circuit diagram in an RGBW mode of the present disclosure.
Figure 7:
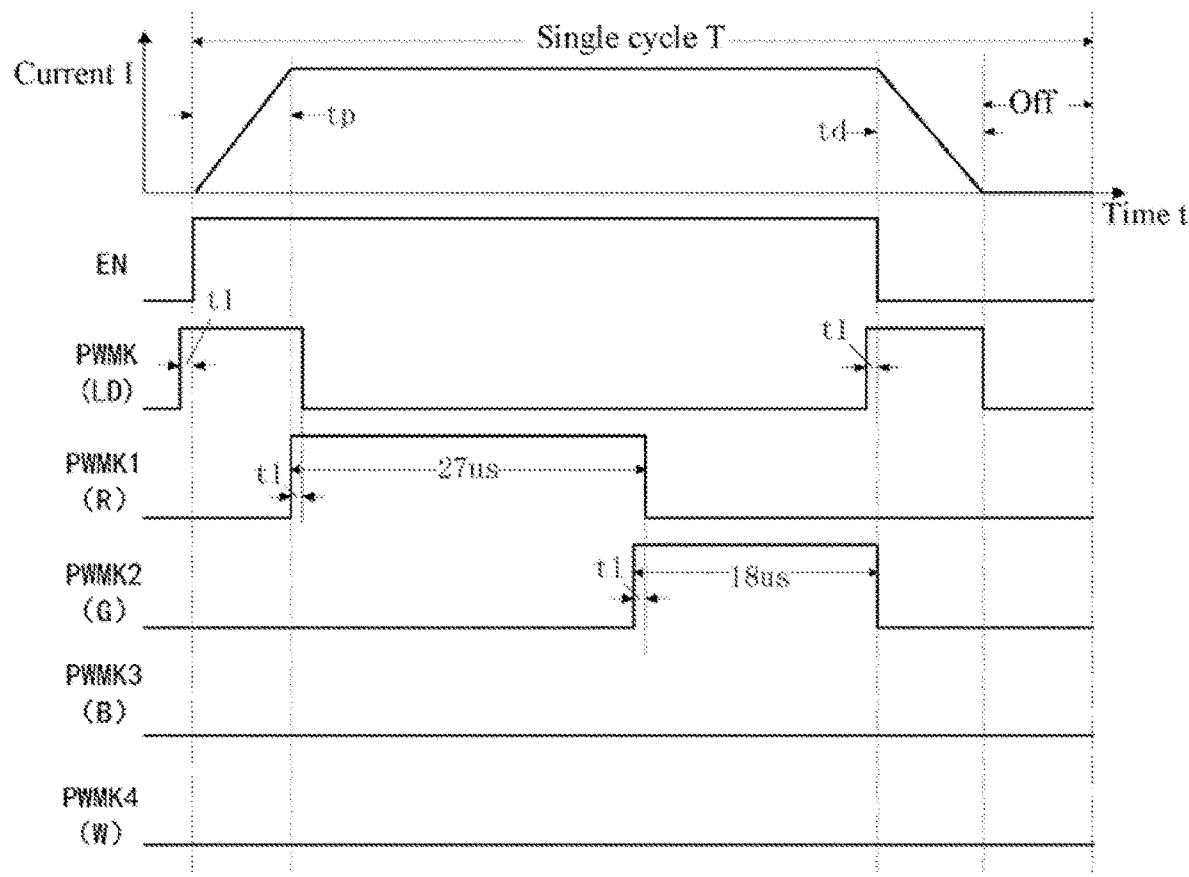
FIG. 7 is a timing diagram of the maximum brightness of a certain orange of the present disclosure.
Figure 8:
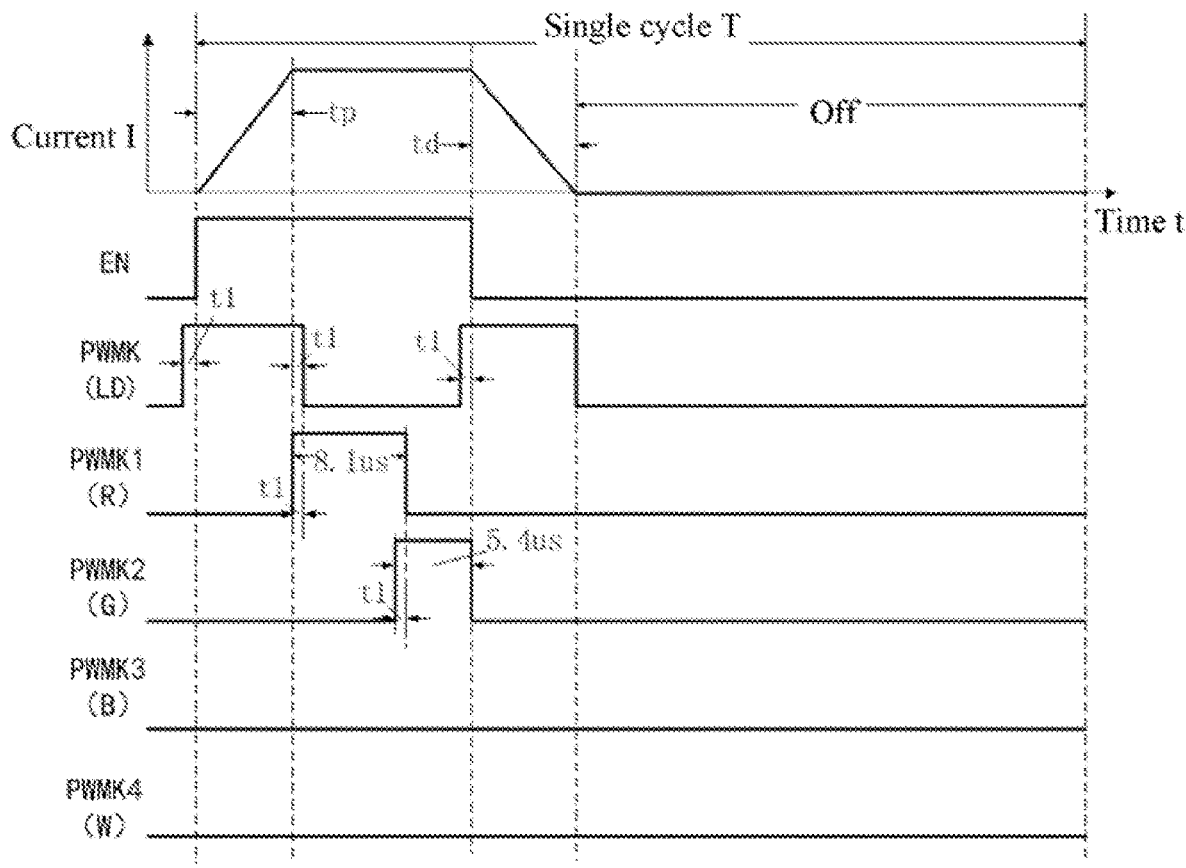
FIG. 8 is a timing diagram of 30% brightness of a certain orange of the present disclosure.

The following describes the color and brightness adjustment of the dimmer system by taking the RGBW mode as an example. As shown in FIG. 5, the main power source 1 is a DC 48 V input, the first constant-current source 2 is a typical DC-DC BUCK circuit with an outputted constant-current value of 5 A and a circuit switching frequency of 1 MHz; the circuit is equivalent to that shown in FIG. 6, in which Vin=48 V, an inductance L of the first constant-current source 2=10 uH, an output is 4 groups of 14 lamp bead strings, the non-light-emitting load element LD is a resistor Rld, a typical voltage value Vout=3 V×14=42 V (voltage values of all the lamp beads of different colors are different and the typical voltage value of 3 V is selected and substituted for calculation) and a current value (5 A) of a reference lamp bead string, and the equivalent resistance value is 8.4Ω. Since the DC-DC BUCK circuit has oscillations itself, in fact, the time of the rising phase of the first constant-current source 2 is calculated as the time in which the current rises from 0% to 90%, and the time of the falling phase is calculated as the time in which the current falls from 100% to 10%. In the current rising phase of the first constant-current source $$2\frac{dI}{dt} = \frac{48 - 8.4I}{10},$$

the relation between current I (A) and time t (us) is $$I = \frac{40}{7} - \frac{40}{7} \times e^{-0.84t};$$

and after the control module 3 outputs the enabling signal EN to control the first constant-current source 2 to be turned on, the time tp in which the current rises from 0% to 90% is about 1.84 us. In the current falling phase of the first constant-current source $$2\frac{dI}{dt} = -\frac{8.4I}{10},$$

the relation between current I (A) and time t (us) is I=5×e⁻⁰·⁸⁴ᵗ; and after the control module 3 outputs the enabling signal EN to control the first constant-current source 2 to be turned off, the time td in which the current falls from 100% to 10% is about 2.74 us. The cycle time T of the dimmer system is 50 us. Then, we can set an implementation manner of reaching 100% brightness when the total on-time of the lamp bead strings is 45 us, and the residual 5 us is the on-time of the non-light-emitting load element LD and the off-time of the constant-current source. The sum of the on-time of all the lamp bead strings does not exceed 45 us. As described above, the coincidence time t1 when two adjacent channels (including the non-light-emitting load element LD) are opened at the same time is set as 30 ns, which accounts for 0.0067% of 45 us and can be ignored during the calculation of duty cycles. Within the single cycle time T, the sum of the durations in which all the lamp bead strings are turned on determines the total brightness of a light source, and the proportions of the durations of lamp bead strings of different colors determine the color of the light source. As shown in FIG. 7 and FIG. 8, a certain orange can be realized only if the ratio of duty cycles of red light R and green light G is 3:2, so an implementation manner of the maximum brightness of this orange is to turn on a red-light lamp bead string R for 27 us and a green-light lamp bead string G for 18 us within a single cycle. An implementation manner of 30% brightness of this orange is to turn on the red-light lamp bead string R for 8.41 us and the green-light lamp bead string G for 5.4 us within a single cycle. As shown in FIG. 8, in a case that the brightness is not the maximum one, the required lamp bead strings are also turned on in turn, and the first constant-current source 2 keeps outputting continuously during the adjustment; after the lamp bead strings are turned on in turn, the first constant-current source 2 is turned off in time through the enabling signal EN, thereby avoiding the problem that the load of the first constant-current source 2 is discontinuous and ensuring the stability and accuracy of color display.

Embodiment 2

Figure 9:
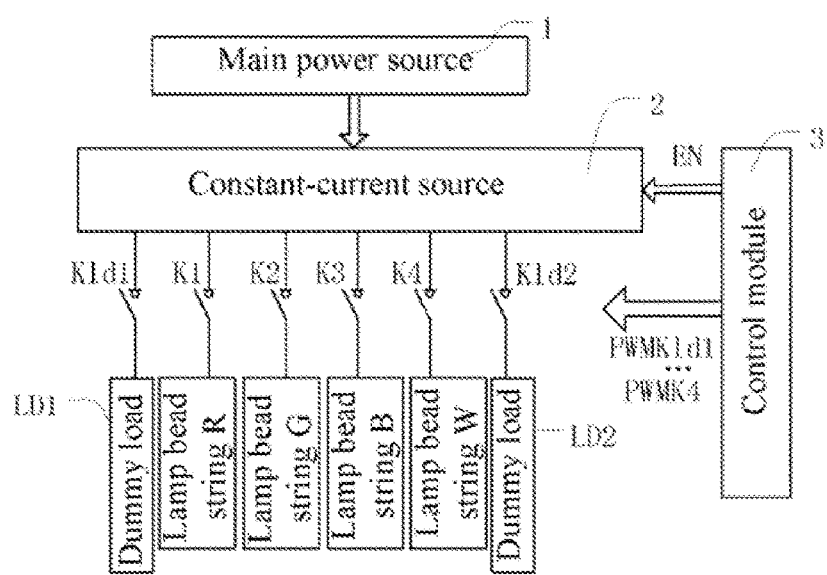
FIG. 9 is a systematic principle block diagram of Embodiment 2 of the present disclosure.
Figure 10:
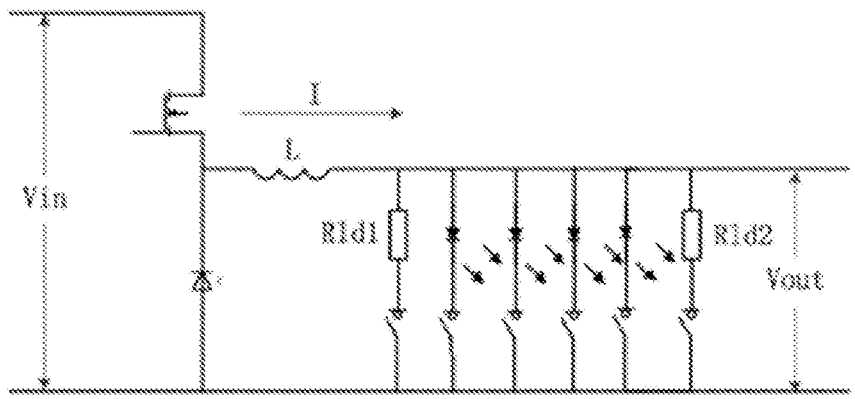
FIG. 10 is an equivalent circuit diagram of Embodiment 2 of the present disclosure.

A calculation formula for a current change rate due to inductance is ΔI/Δt=ΔU/L. In any DC-DC or AC-DC power source topology model, ΔU in a current rising interval is different from that in a current falling interval; and when only one non-light-emitting load element is used, the current rising or falling time may be longer and the power loss of the non-light-emitting load element may also be greater. Therefore, using two non-light-emitting load elements is a more optimized design, as shown in FIG. 9. An equivalent circuit diagram is FIG. 10. In the current rising phase, ΔI/Δt=ΔU/L≈(Vin−I×Rld1)/L, and therefore, the current rises more rapidly when Rld1 is smaller, and Rld1 may be a small-value resistance at an mΩ level; and in the current falling phase, ΔI/Δt=ΔU/L≈I×Rld2/L, and therefore, the current falls more rapidly when Rld2 is greater, and Rld2 may be Vout/I during normal operation. Similar to Embodiment 1, the main power source 1 is a DC 48 V input, the first constant-current source 2 is a typical DC-DC BUCK circuit with an outputted constant current value of 5 A, a circuit switching frequency of 1 MHz, Vin=48 V and an inductance L of the first constant-current source 2=10 uH; an output is 4 groups of 14 lamp bead strings, two non-light-emitting load elements are Rld1 and Rld2 respectively, where Rld1 is a power resistance of 1 mΩ (approximately equal to short-circuit after connection) and Rld2 is a power resistance of 10Ω; where ΔI is a variation amount of inductor current, Δt is a variation amount of time, ΔU is a variation amount of inductor voltage, L is an inductance value of an inductor, I is an inductor current, Rld1 is a resistance value of the non-light-emitting load element LD1, Rld2 is a resistance value of the non-light-emitting load element LD2, Vin is a direct-current input voltage of the main power source, and Vout is an output voltage of a load circuit of the system.

Compared with one non-light-emitting load element in Embodiment 1, the two non-light-emitting load elements in this embodiment have the following advantages:
  (1) Current rising time and current falling time may be controllable, respectively, and the freedom of design is higher.
  (2) The current rising time and the current falling time are shorter, the duration in which the first stage of current rises from 0% to 90% is $$t = \frac{I*L}{U} = \frac{0.9 \times 5 \text{ A} \times 10 \text{ }\mu\text{H}}{48 \text{ V}} = 0.93 \text{ us},$$

the relation between the second stage of current I (A) and time t (us) is I=5e⁻ᵗ, and the duration in which the current falls from 100% to 10% is calculated to be 2.3 us.
  (3) The heat loss is lower.

In Embodiment 1, the estimation formula for heat loss power of the non-light-emitting load element is:

$$P = \left\{ \int_0^{1.84} \left[ \left(\frac{40}{7} - \frac{40}{7}e^{-0.84t}\right)^2 \times 8.4 \right] dt + \int_0^{2.74} \left[ (5e^{-0.84t})^2 \times 8.4 \right] dt \right\} \times 20 \text{ KHz} \times 0.000001 \text{ s} \approx$$

$$2.93 \text{ W} + 2.47 \text{ W} = 5.4 \text{ W}$$

In this embodiment, the loss of the two non-light-emitting load elements can ignore the Rld1 in the current rising phase, and the main loss is Rld2 in the current falling phase. Therefore, the estimation for heat loss power of the non-light-emitting load element in Embodiment 2 is: P=∫₀²·³ [(5e⁻ᵗ)²×10]dt×20 KHz×0.000001 s≈2.47 W. Compared with Embodiment 1, Embodiment 2 has a lower heat loss.

Embodiment 3

The brightness adjustment in both Embodiment 1 and Embodiment 2 is realized by the sum of the durations of the duty cycles of PWM signals of all the lamp bead strings, which are outputted by the control module 3, and the range of brightness adjustment is also limited. The most direct way for adjusting the brightness is to reduce the current passing through the lamp beads. Therefore, in order to improve the dimming accuracy of a lighting system and be able to adjust the brightness smoothly, it is necessary to improve a current source therein.

Figure 11:
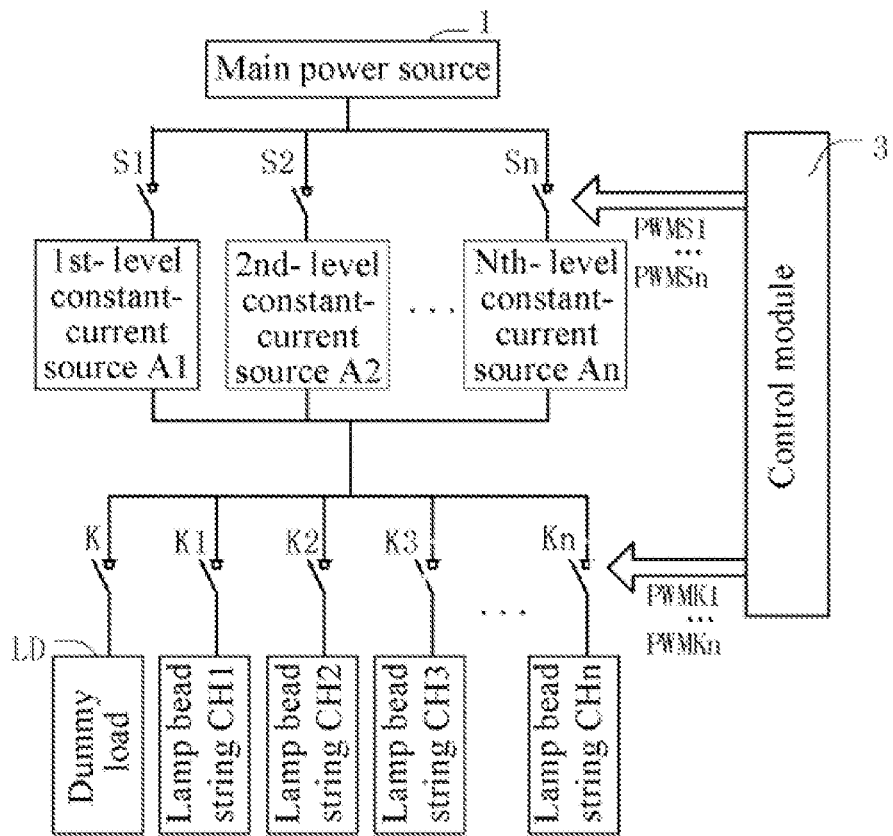
FIG. 11 is a principle block diagram of Embodiment 3 of the present disclosure.

As shown in FIG. 11, the main power source 1 may be an AC or DC external power source input. After being inputted, the main power source 1 passes through switching circuits S1, S2 . . . Sn to select different constant-current sources A1, A2 . . . An, and is subjected to AC-DC or DC-DC conversion to form a plurality of levels of constant-current output for driving a plurality of lamp bead strings to emit light. The constant-current sources A1, A2 . . . An output different current values I1, I2 . . . In, such as settings of 5 A, 1 A, 0.2 A, 0.04 A . . . , or 4 A, 0.4 A, 0.04 A . . . . In short, the current values outputted by the constant-current sources A1, A2 . . . An may be arrayed in a form of geometric progression or otherwise realize the transition from an ampere level to a milliampere level. The purpose of such settings is to realize high brightness and smooth transition of light adjustment of the lighting system in the field of film-television lighting at the same time. More particularly, the constant-current sources of ampere-level current values are intended to meet the requirements on high brightness of the lighting system and the constant-current sources of milliampere-level current values are intended to meet the requirements on smooth transition of the lighting system, so that the present disclosure has high brightness and can also adjust the brightness very smoothly. On one hand, the control module 3 outputs PWMS1, PWMS2 . . . PWMSn signals for controlling the on/off of the switching circuits S1, S2 . . . Sn, so as to implement the control on the constant-current sources; meanwhile, the PWMK1, PWMK2 . . . PWMKn signals are used for controlling the on/off of the switching circuits K1, K2 . . . Kn, so as to control the on/off of the lamp bead strings CH1, CH2 . . . CHn, that is, the changes of light color and brightness are controlled by adjusting two groups of PWM signals in this embodiment. The switching circuits S1, S2 . . . Sn may also be realized by an MOSFET, an IGBT, a triode, a GaN field-effect transistor or a high-speed relay, etc.

Figure 12:
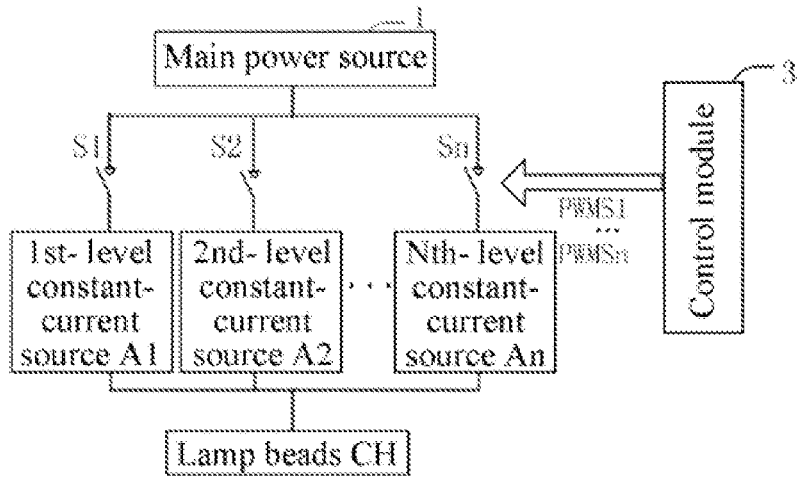
FIG. 12 is a simplified principle block diagram of a load of FIG. 11.
Figure 13:
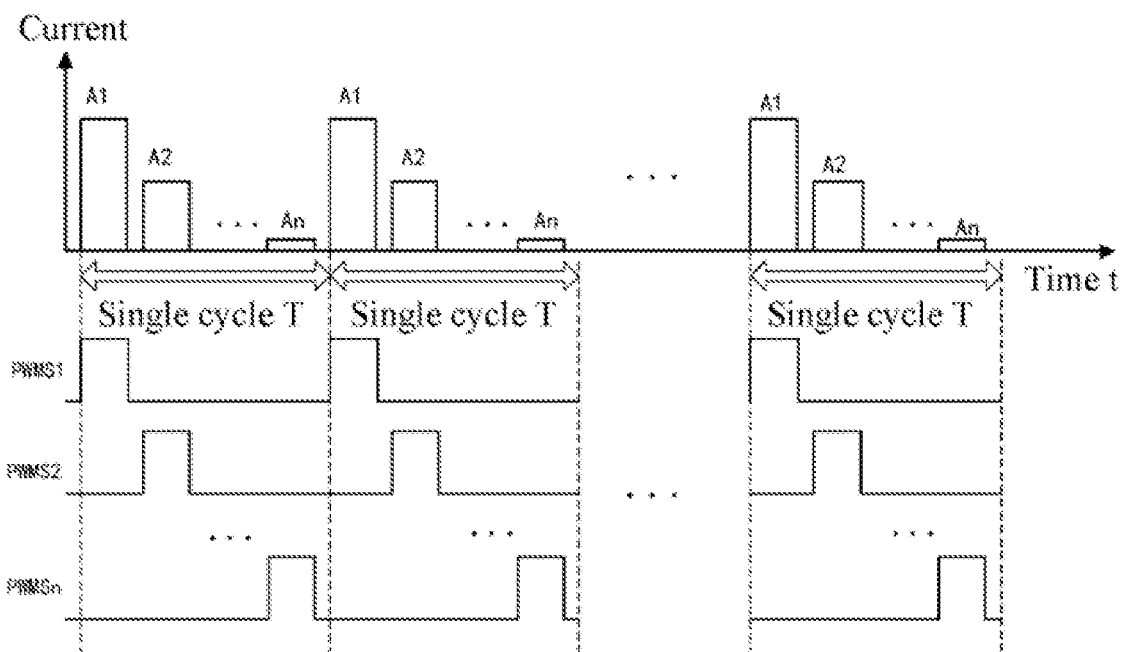
FIG. 13 is a timing diagram of temporal calling on a plurality of levels of power sources in a single cycle in the present disclosure.
Figure 14:
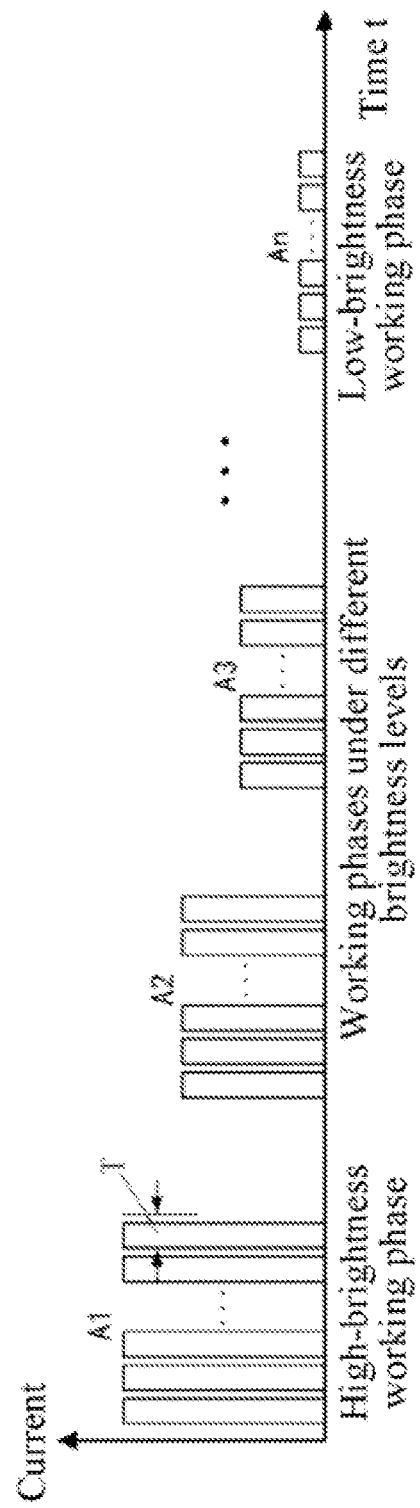
FIG. 14 is a timing diagram of individually using a certain level of power source under different brightness levels of the present disclosure.
Figure 15:
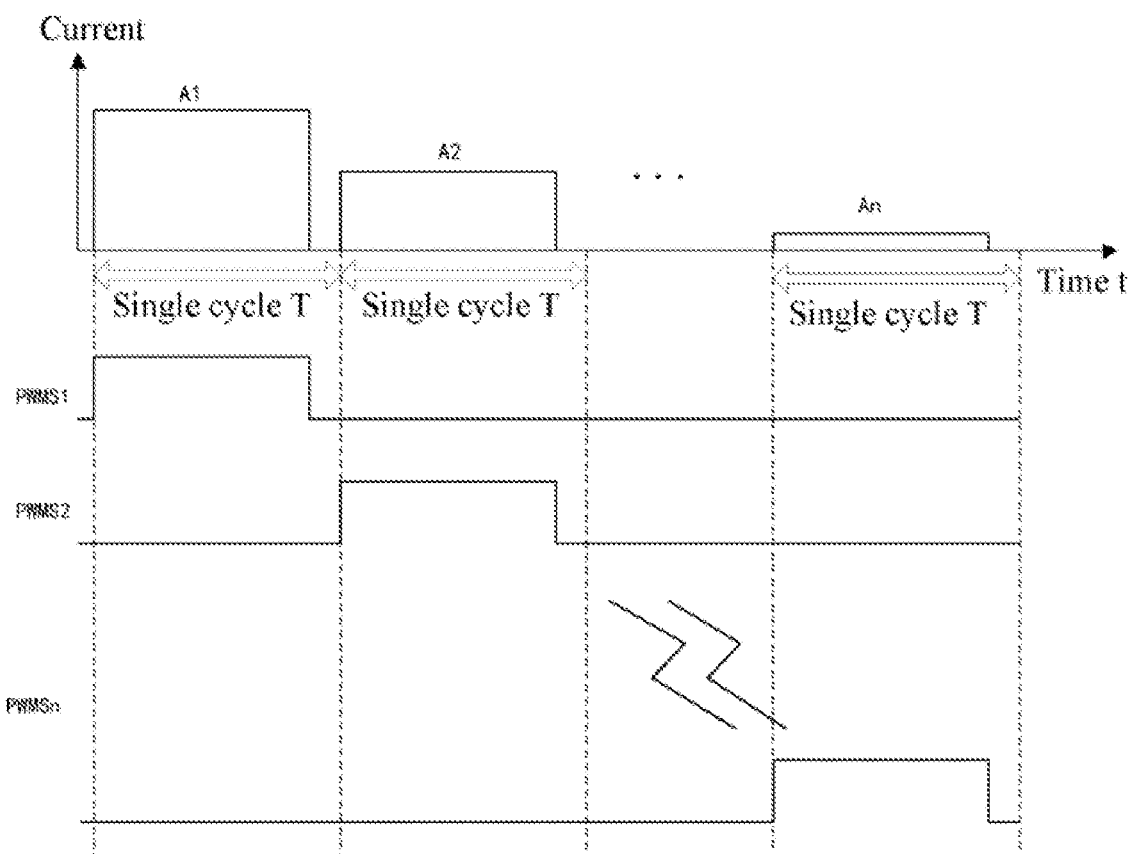
FIG. 15 is a multi-level power source timing diagram generated in a process of continuous brightness adjustment of the present disclosure.

For convenience of description of controlling a plurality of levels of constant-current sources by the control module 3, the plurality of lamp bead strings and the non-light-emitting load elements in FIG. 11 are simplified as the lamp bead string CH as shown in FIG. 12; and it is assumed that the constant-current sources and the switching circuits are in an ideal state, that is, there are no current rising and falling phases or switch delay and other problems. There are two operating modes for the plurality of levels of constant-current sources. One is to perform temporal calling on a plurality of levels of power sources within a single cycle T, and a timing is as shown in FIG. 13; the control module 3 controls the on/off of the switching circuits S1, S2 . . . Sn through the PWMS1, PWMS2 . . . PWMSn signals to perform temporal calling on the constant-current sources A1, A2 . . . An within a single cycle T; the so-called temporal calling within a single cycle T is to adjust the drive current of the lamp bead string CH by calling different constant-current sources in different time periods to control the proportions of the duty cycles of PWMS1, PWMS2 . . . PWMSn, so as to adjust the brightness smoothly. The other is to individually use a certain level of power source under different brightness levels, and a timing is as shown in FIG. 14; and the control module 3 controls the on/off of the switching circuits S1, S2 . . . Sn through the PWMS1, PWMS2 . . . PWMSn signals, and selects different constant-current sources to drive the lamp bead string CH under different brightnesses, so as to adjust the brightness smoothly. FIG. 15 shows a timing diagram generated in a process of continuous brightness adjustment.

With respect to the PWM temporal dimmer system with a plurality of levels of constant-current sources as shown in FIG. 11, it is assumed that the plurality of levels of constant-current sources work in a manner of selecting different constant-current sources for driving under different brightnesses and PWM proportions of the light colors can be obtained by turning on the lamp bead strings CH1, CH2, CH3 . . . CHn within the cycle T for durations D1, D2, D3 . . . Dn, respectively.

Figure 16:
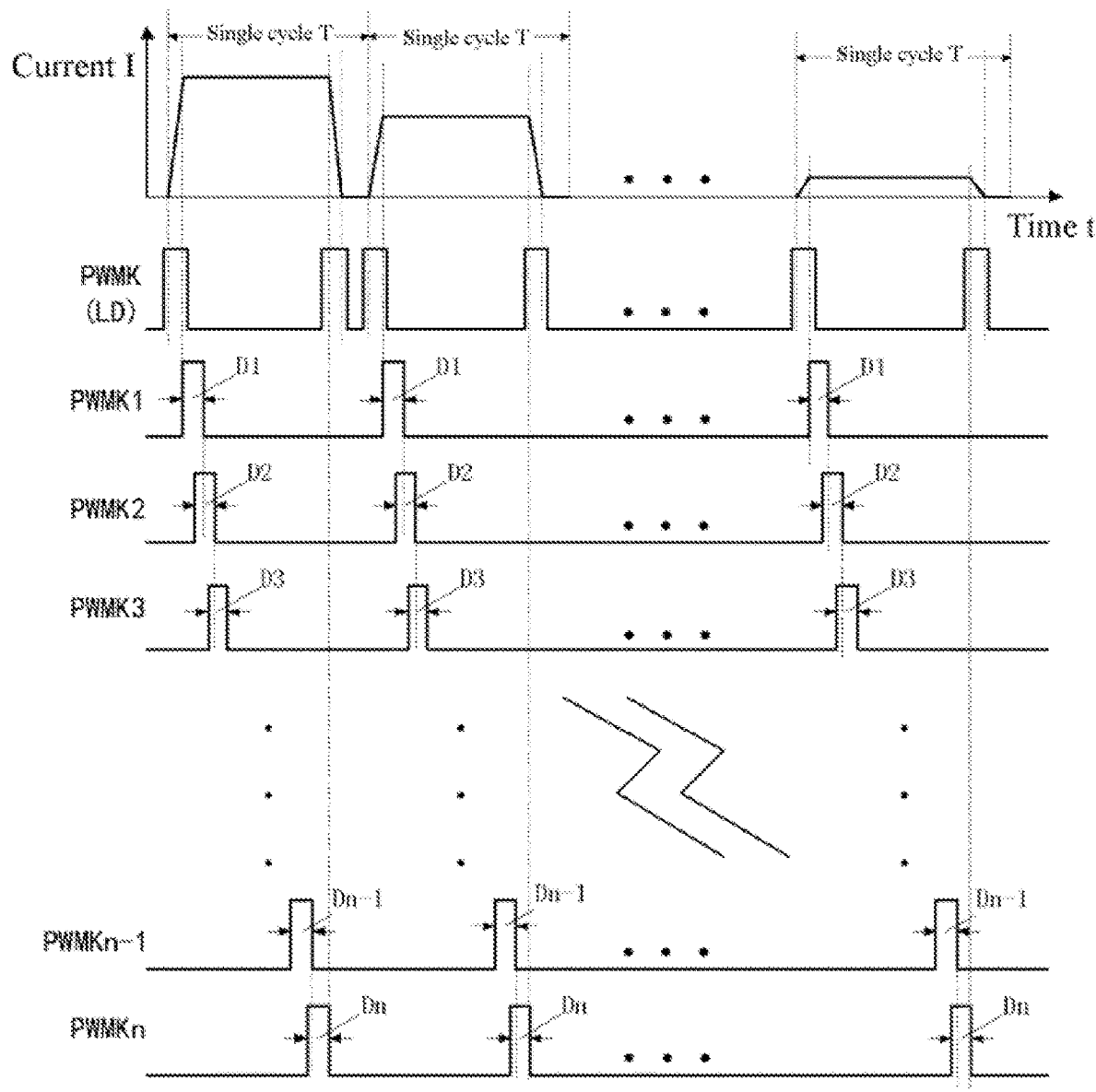
FIG. 16 is a timing diagram of Embodiment 3 of the present disclosure.

When the color brightness is smoothly adjusted from the brightest to the darkest, the timing diagram of the whole system is a timing diagram as shown in FIG. 16 (with PWMS1, PWMS2 . . . PWMSn omitted).

Embodiment 4

Figure 17:
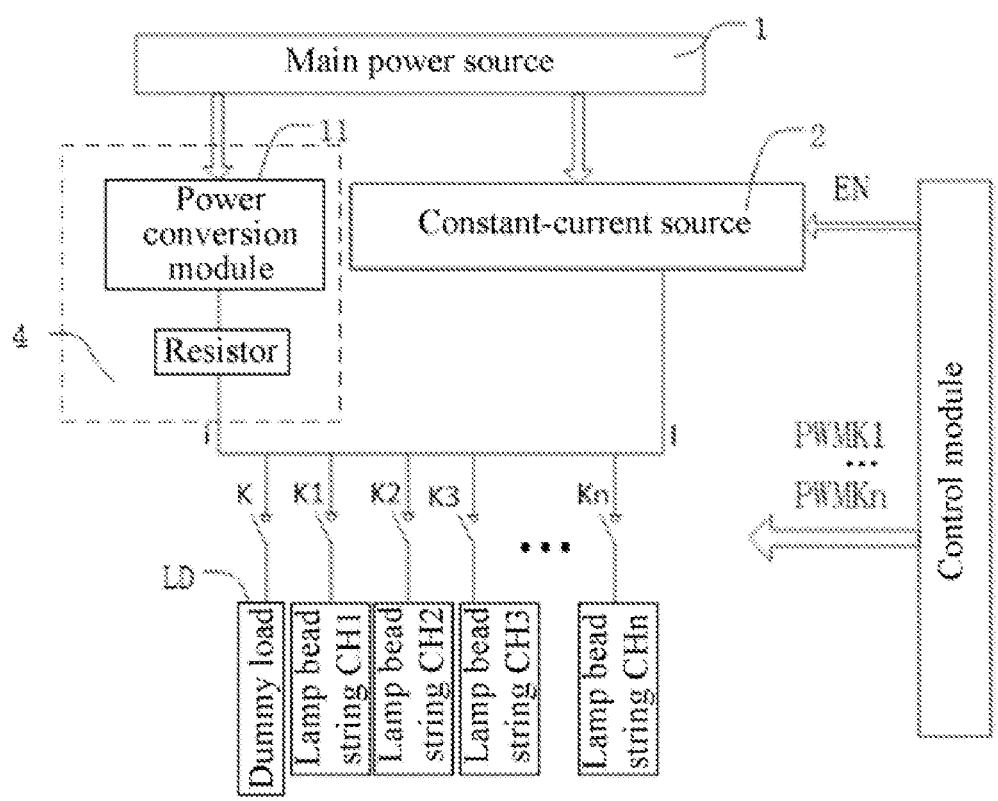
FIG. 17 is a systematic principle block diagram of Embodiment 4 of the present disclosure.

This embodiment is a special form of Embodiment 3, that is, there are a plurality of constant-current sources in Embodiment 3 and this embodiment adopts two constant-current sources. As shown in FIG. 17, after being inputted, the main power source 1 is divided into two paths. One path passes through a power conversion module 11 and is subjected to AC-DC or DC-DC conversion to form a direct-current power source, and then passes through a resistor; this portion can be equivalent to a second constant-current source 4 and outputs a constant current i; and the other path passes through the first constant-current source 2 to output a constant current I, as described in Embodiment 1. The power conversion module 11 also needs to supply power to the control module 3. The second constant-current source 4 and the first constant-current source 2 are connected in parallel to drive the lamp bead strings CH1, CH2 . . . CHn and the non-light-emitting load element LD. The first constant-current source 2 is used for a high current phase of the lighting equipment and the current I is generally at an ampere level; and the second constant-current source 4 is used for a low current phase of the lighting equipment and the current i is generally dozens of mA, that is, at a milliampere level. It should be noted that, when the control module 3 controls the switching between two lamp bead strings, the high current phase in Embodiment 3 and Embodiment 4 is the same as that in Embodiment 1, and the control module 3 always controls the PWM signal corresponding to the latter lamp bead string to output a high level and then controls the PWM signal corresponding to the former lamp bead string to output a low level.

Figure 18:
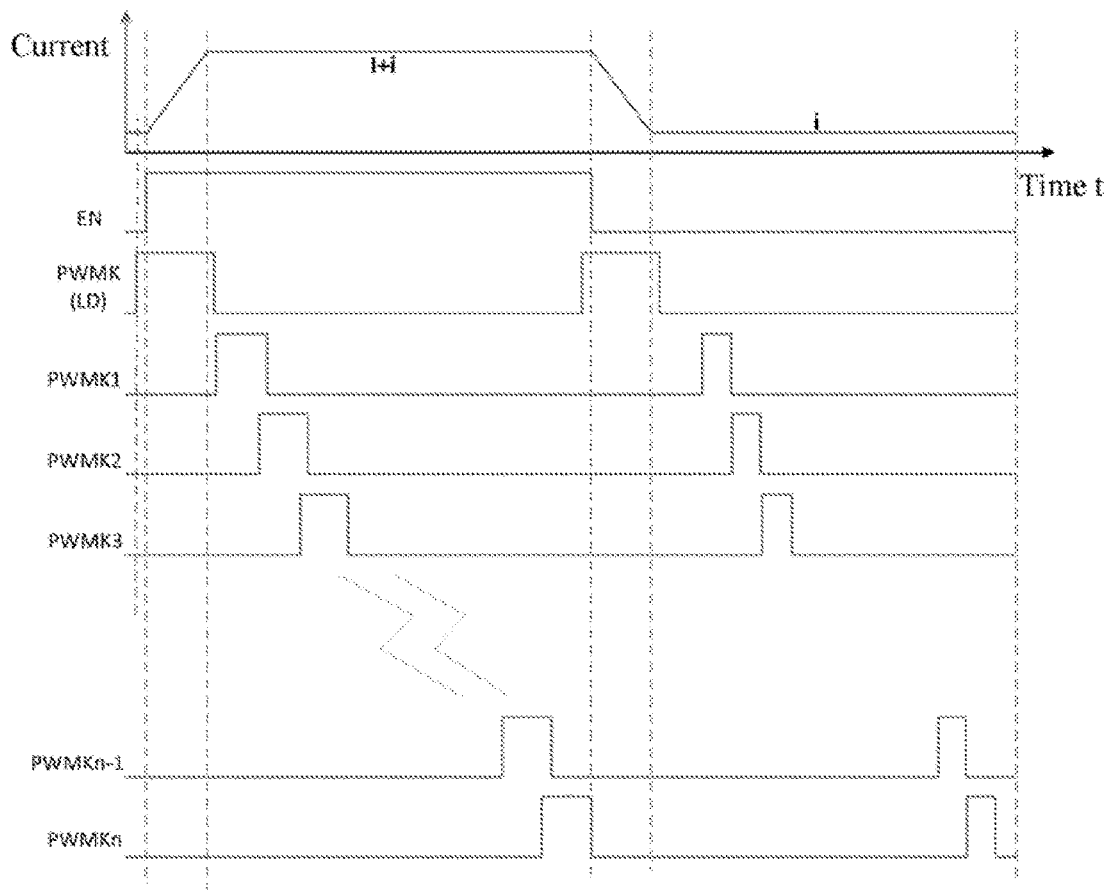
FIG. 18 is a timing diagram of FIG. 17.

A timing diagram is as shown in FIG. 18. When the enabling signal EN controls the first constant-current source 2 to turn on, the lighting equipment works in the normal-brightness phase, and the timing is similar to FIG. 4 of Embodiment 1. After the enabling signal EN controls the first constant-current source 2 to be turned off, only the second constant-current source 4 works, a drive current i of the lamp bead string is only at the milliampere level, and the lighting equipment works in a low brightness phase. The energy outputted by the second constant-current source 4 itself is relatively low and a load resistor of the power conversion module 11 and the control module 3 work continuously all the time, and the PWMK1, PWMK2 . . . PWMKn signals at this time do not need to output a high level in advance.

Figure 19:
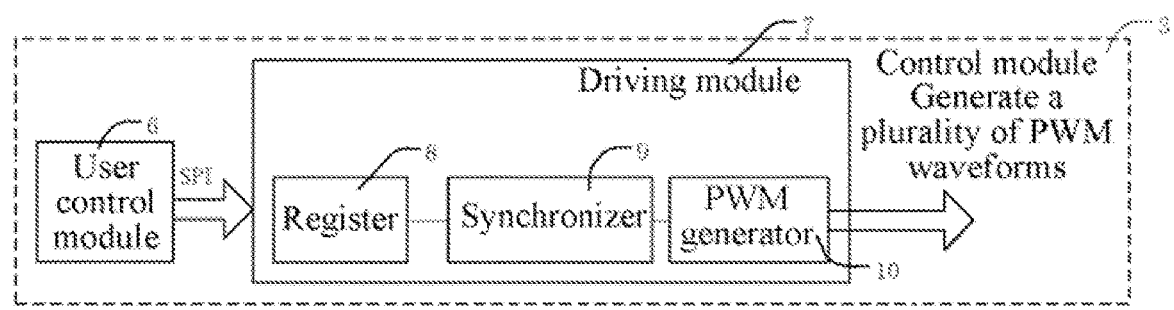
FIG. 19 is the first principle block diagram of a control module in the present disclosure.
Figure 20:
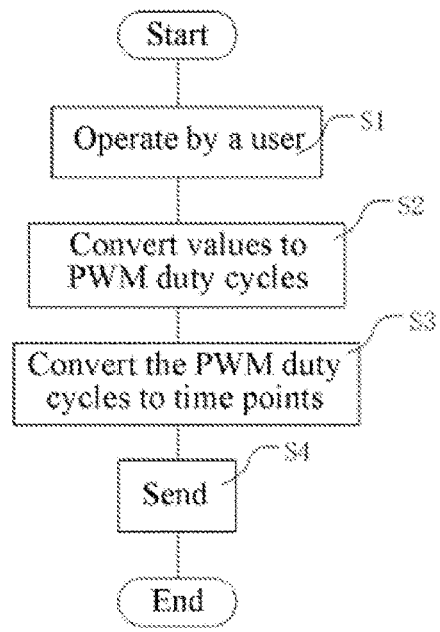
FIG. 20 is a processing flowchart of a user control module in the present disclosure.
Figure 21:
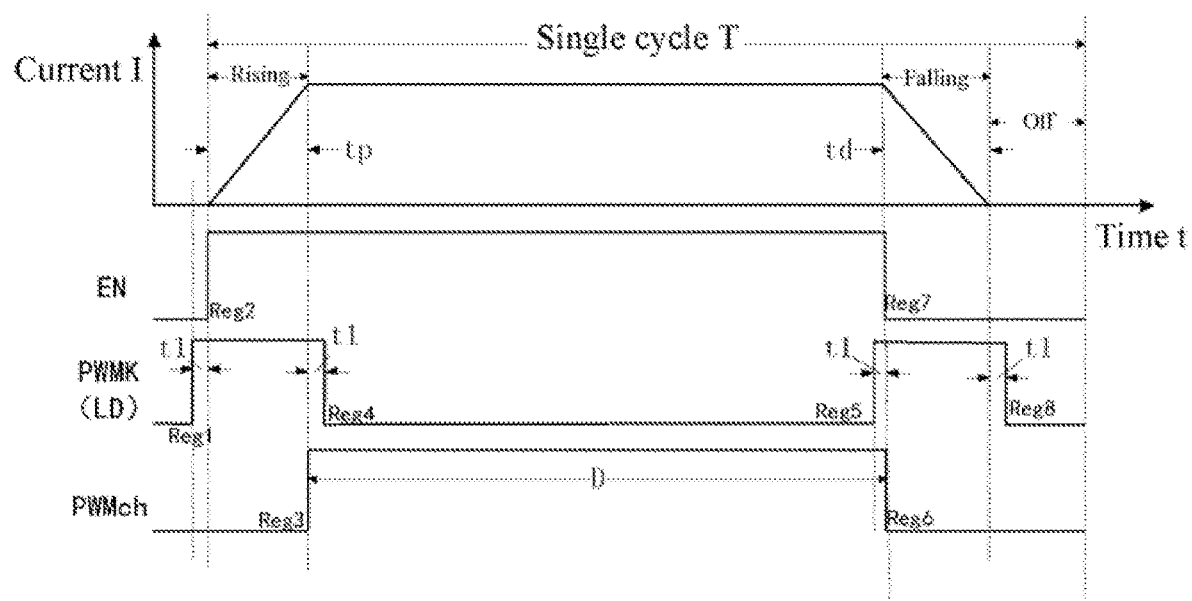
FIG. 21 is a principle schematic diagram of converting a PWM duty cycle into a time point in the present disclosure.
Figure 23:
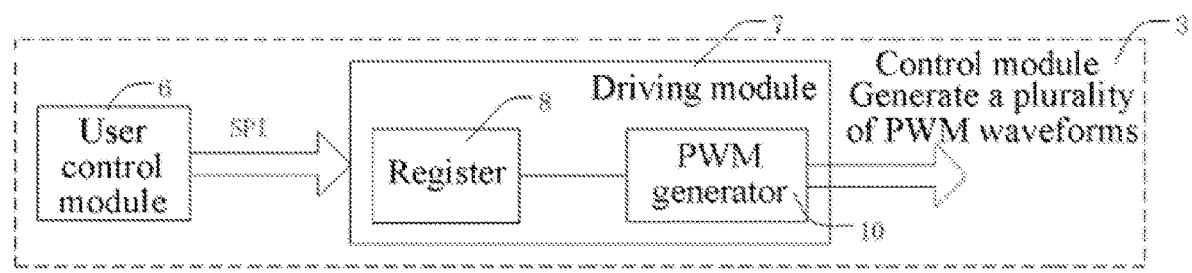
FIG. 23 is the second principle block diagram of a control module in the present disclosure.
Figure 24:
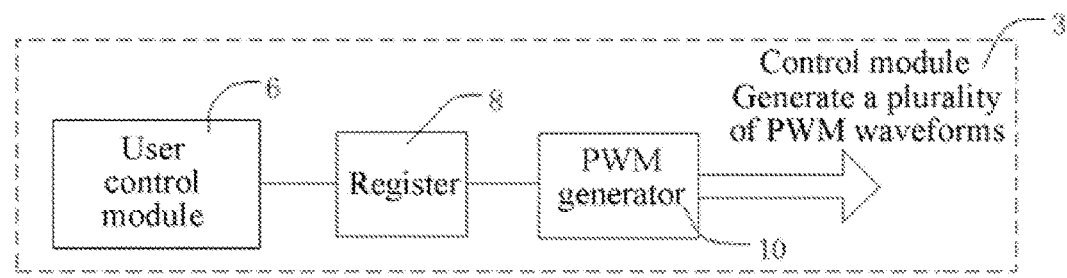
FIG. 24 is the third principle block diagram of a control module in the present disclosure (a user control module is integrated in a driving module).

The problem about the timing of PWM signals is involved in all of Embodiment 1, Embodiment 2, Embodiment 3, and Embodiment 4. The PWM signals are generated by the control module 3. As shown in FIG. 19, FIG. 23, and FIG. 24, the control module 3 is composed of a user control module 6 and a driving module 7. The driving module 7 internally includes a register 8, a synchronizer 9, and a PWM generator 10. Signals are transferred between the user control module 6 and the driving module 7 through an SPI interface. The user control module 6 is used for converting results of user operation into a PWM duty cycle and sending same to the driving module 7. A flowchart of the user control module 6, as shown in FIG. 20, includes: S1: operating by a user: The user adjusts required light tone, brightness, and color temperature by adjusting HSI parameters of the lighting equipment, and the user control module 6 can convert the HSI parameters into values of all the lamp bead strings corresponding to a dimming mode, for example, RGBWW or RGB values; S2: converting the values to PWM duty cycles: The values of all the lamp bead strings are converted into corresponding PWM duty cycles, where the above S1 and S2 are mentioned in the prior art and details are not described herein again; S3: converting the PWM duty cycles to time points: The PWM duty cycles of the corresponding lamp bead strings are converted into time points corresponding to high and low levels of PWM signals; and S4: sending: The time points obtained in S3 are sent to the register 8 of the driving module 7 for saving. In step S3, it is required to convert the PWM duty cycles into the corresponding time points at which the high and low levels of the PWM signals are converted; and a simplified timing diagram of Embodiment 1, that is, FIG. 3, is taken as an example, and the time points marked are as shown in FIG. 21. In FIG. 21, 8 time points of 3 PWM signals are involved, including Reg1, Reg2, Reg3, Reg4, Reg5, Reg6, Reg7, and Reg8 in sequence. Since the non-light-emitting load element LD is turned on firstly, the PWMK signals are outputted at a high level the first time and the time point Reg1 may be set as 0, that is to say, the PWMK signals need to be changed from a low level to a high level at the time point 0; after time t1, the first constant-current source 2 is turned on and the enabling signal EN is outputted at a high level, and at this time, the time point Reg2 is (0+t1), that is to say, the enabling signal EN needs to be changed from a low level to a high level at the time point (0+t1). The time of duration of the non-light-emitting load element LD is correlated with the current rising time and the current falling time of the first constant-current source 2 and the current rising time and the current falling time are determined by the circuit of the first constant-current source 2. Assuming that the rising time is tp and the falling time is td depending on the sizes of voltage and current of the inductor, the time point Reg4 is (tp+2t1), that is to say, the PWMK signals need to be changed from a high level to a low level at the time point (tp+2t1). The lamp beads CH may be turned on after the first constant-current source 2 outputs stably; and when the PWMch signal is outputted at a high level, the time point Reg3 is (Reg4−t1), that is to say, the PWMch signal needs to be changed from a low level to a high level at the time point (tp+t1). The time of high level of the PWMch signal is calculated by the PWM duty cycle; and assuming that it is D, the time point Reg6 is (Reg3+D), that is to say, the PWMch signal needs to be changed from a high level to a low level at the time point (tp+t1+D). The time point Reg7 is equivalent to Reg6, that is to say, the enabling signal EN needs to be changed from a high level to a low level at the time point (tp+t1+D). The time point Reg5 is (Reg7−t1), that is to say, the PWMK signal needs to be changed from a low level to a high level at the time point (tp+D). The time point Reg8 is (Reg7+td+t1), that is to say, the PWMK signal needs to be changed from a high level to a low level at the time point (tp+D+td+2t1).

Figure 22:
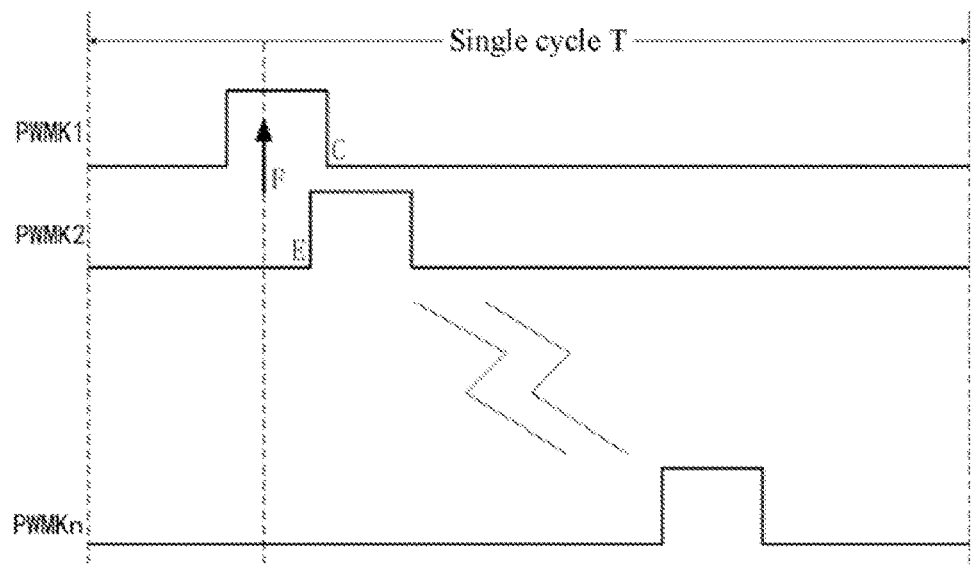
FIG. 22 is a function schematic diagram of a synchronizer in the present disclosure.

After the corresponding time points of the PWM signals are obtained, the user control module 6 sends the time points to the register 8. The register 8 sends the time points to the synchronizer 9, then the synchronizer 9 sends same to the PWM generator 10, and the PWM generator 10 generates the PWM signals according to the time points received from the register 8. Certainly, duty cycles may also be generated by step S2 of the user control module 6 and sent to the register 8, and then the PWM signals are generated by the PWM generator 10. However, the PWM signals only change over the duty cycles. Once circuit parameters change, the driving module 7 is not applicable and the portability is poor. When the PWM signals are generated by the time points, the PWM signals change over the time points; and both a user and a manufacturer can change the PWM signals according to the changes of the circuit parameters, for example, a precision mode with a shorter duration t1 is provided for the user or in-plant commissioning to select. For example, even if the parameters of the first constant-current source 2 or the second constant-current source 4 change, only values of durations tp and td need to be changed, and the driving module 7 may be adapted to different circuit parameters. The function of the synchronizer 9 is as shown in FIG. 22. Assuming that the user adjusts HSI of the lighting equipment at the time point F shown by the arrow according to normal steps, the time point C of PWMK1 needs to be adjusted at the time point F; because the time point E is correlated with the time point C, the time point E needs to be adjusted synchronously, and a plurality of PWM waveforms need to be adjusted synchronously in turn. However, the plurality of PWM waveforms cannot be adjusted at the same time in actual situations because the time points of the PWM signals are generated in sequence and sent to the register 8 in the control module 3 serially. In this case, the adjusted time points of the PWM signals need to be cached into the register 8 firstly and then pass through synchronizer 9; and the time points are sent to the PWM generator 10 after a single cycle T ends, and adjusted PWM signals are then generated in the next cycle T.

Certainly, in specific implementation, the synchronizer 9 is not necessary. As shown in FIG. 23, the function of the synchronizer 9 during actual use may be realized in the PWM generator 10. In addition, the function of the user control module 6 may also be realized in the driving module 7 only if the resources of the driving module 7 are sufficient, that is, the user control module 6 may be disposed in the driving module 7, as shown in FIG. 24.

By adopting the technical solution of the present disclosure, enabling control on a single constant-current source is realized within one cycle; when the brightness is adjusted by utilizing the sum of the duty cycles, all the PWM signals are outputted continuously, the constant-current sources keep outputting continuously during the adjustment, and the constant-current sources are turned off after the adjustment is completed; at the moment of switching any two lamp bead strings during multi-PWM temporal dimming, the lamp bead string needing to be turned on is turned on firstly and then the former lamp bead string is turned off to eliminate delay existing in normal switching and ensure the continuity of total current of the system.

What is claimed is:

1. An LED lighting circuit based on PWM, comprising a power source, a control circuit and an LED light-emitting element, and further comprising a non-light-emitting load element, the non-light-emitting load element being connected in parallel to the LED light-emitting element, the power source being connected to a constant-current source, the constant-current source supplying power to the LED light-emitting element and the non-light-emitting load element, and when the constant-current source is in a current rising or falling phase, the control circuit controlling an LED light-emitting element loop to be disconnected, and controlling a non-light-emitting load element loop to be connected; and when the current of the constant-current source is in a steady state, the control circuit controlling the non-light-emitting load element loop to be disconnected, and controlling the LED light-emitting element loop to be connected.

2. The LED lighting circuit based on PWM according to claim 1, wherein the non-light-emitting load element is a resistor.

3. The LED lighting circuit based on PWM according to claim 1, wherein 2 non-light-emitting load elements are provided, one is turned on in the current rising phase of the constant-current source and the other is turned on in the current falling phase of the constant-current source.

4. A temporal dimmer control circuit based on PWM, the control circuit comprising:
   a main power source used for supplying power to the control circuit;
   at least two LED light-emitting elements,
   a constant-current source, used for providing a drive current to the LED light-emitting elements;
   a switching circuit used for controlling the on/off of a connection between the constant-current source and the LED light-emitting elements; and
   a control module used for controlling the on/off of the switching circuit;
   wherein the constant-current source, the switching circuit, and the LED light-emitting elements being connected in series;
   wherein the switching circuit comprising at least two switches, each switch controlling one LED light-emitting element, and the control module outputting a PWM control signal to control the on/off of the switching circuit;
   wherein, when the two LED light-emitting elements are switched, the control module controlling PWM waveforms corresponding to the two LED light-emitting elements to be partially overlapped;
   wherein the control circuit further comprises a non-light-emitting load element, the non-light-emitting load element being connected in parallel to the LED light-emitting element;
   wherein, in a current rising or falling phase of the constant-current source, the control module controls an LED light-emitting element loop to be disconnected, and controls a non-light-emitting load element loop to be connected; and
   wherein, when the current of the constant-current source is steady, the control module controls the non-light-emitting load element loop to be disconnected, and controls the LED light-emitting element loop to be connected.

5. The temporal dimmer control circuit based on PWM according to claim 4, wherein the control module controls a PWM signal corresponding to a latter LED light-emitting element to output a high level, and then controls a PWM signal corresponding to a former LED light-emitting element to output a low level, so that the PWM waveforms corresponding to the two LED light-emitting elements are partially overlapped.

6. The temporal dimmer control circuit based on PWM according to claim 4, wherein a plurality of the constant-current sources are provided.

7. The temporal dimmer control circuit based on PWM according to claim 6, wherein the control module controls the on/off of a plurality of switching circuits, and performs temporal calling on the plurality of constant-current sources within a single cycle to adjust the drive current of the LED light-emitting elements;
   alternatively, the control module controls the on/off of the plurality of switching circuits to select the constant-current sources with different current to drive the LED light-emitting elements.

8. The temporal dimmer control circuit based on PWM according to claim 4, wherein two constant-current sources are provided, one is an ampere-level constant-current source, and the other is a milliampere-level constant-current source.

9. The temporal dimmer control circuit based on PWM according to claim 4, wherein the control module comprises a user control module and a driving module; the user control module is used for receiving user's instructions, converting same into time points at which high and low levels of PWM signals are converted, and sending to the driving module; the driving module comprises a register and a PWM generator; the register is connected to the PWM generator; the register receives and saves the time points at which the high and low levels of the PWM signals are converted, which are sent by the control module, and then transmits same to the PWM generator; and the PWM generator generates and outputs PWM signals for controlling the constant-current sources and the switching circuits, respectively.

10. A temporal dimmer control method based on PWM, used for the temporal dimmer control circuit based on PWM according to claim 4, the control method comprising: when two LED light-emitting elements are switched, the control module controlling PWM waveforms corresponding to the two LED light-emitting elements to be partially overlapped.

11. The temporal dimmer control method based on PWM according to claim 10, wherein the control module controls a PWM signal corresponding to a latter LED light-emitting element to output a high level, and then controls a PWM signal corresponding to a former LED light-emitting element to output a low level.

12. The temporal dimmer control method based on PWM according to claim 10, wherein the control method further comprises:
   S1: receiving and converting a user input instruction by the control module into a PWM duty cycle;
   S2: sending the PWM duty cycle signal to a register in the control module, and sending a received PWM duty cycle signal by the register to a PWM generator to generate a PWM signal; and
   S3: outputting the PWM signal by the control module to control the LED light-emitting elements and a constant-current source, respectively;
   alternatively,
   S1': receiving and converting a user input instruction by the control module into a PWM duty cycle;

S2': converting the PWM duty cycle of the corresponding LED light-emitting element in step S1' into a time point at which high and low levels of a PWM signal are converted;

S3': sending the time point corresponding to each LED light-emitting element in step S2' into a register in the control module, and sending the stored time point by the register to a PWM generator to generate a PWM signal; and S4': outputting the PWM signal by the control module to control the switching of the LED light-emitting elements and a constant-current source, respectively.

13. The temporal dimmer control method based on PWM according to claim 10, wherein when in current rising and falling phases of the constant-current source, the control module controls the LED light-emitting element loop to be disconnected, and controls the non-light-emitting load element loop to be connected; and when the current is steady, the control module controls the non-light-emitting load element loop to be disconnected, and controls the LED light-emitting element loop to be closed.

14. The temporal dimmer control method based on PWM according to claim 11, wherein when in current rising and falling phases of the constant-current source, the control module controls the LED light-emitting element loop to be disconnected, and controls the non-light-emitting load element loop to be connected; and when the current is steady, the control module controls the non-light-emitting load element loop to be disconnected, and controls the LED light-emitting element loop to be closed.

15. The temporal dimmer control circuit based on PWM according to claim 5, wherein the control module comprises a user control module and a driving module; the user control module is used for receiving user's instructions, converting same into time points at which high and low levels of PWM signals are converted, and sending to the driving module; the driving module comprises a register and a PWM generator; the register is connected to the PWM generator; the register receives and saves the time points at which the high and low levels of the PWM signals are converted, which are sent by the control module, and then transmits same to the PWM generator; and the PWM generator generates and outputs PWM signals for controlling the constant-current sources and the switching circuits, respectively.

* * * * *